US012695162B2

(12) United States Patent
Takeuchi et al.

(10) Patent No.: US 12,695,162 B2
(45) Date of Patent: Jul. 28, 2026

(54) NONAQUEOUS ELECTROLYTE SECONDARY BATTERY

(71) Applicant: Panasonic Intellectual Property Management Co., Ltd., Osaka (JP)

(72) Inventors: Masanobu Takeuchi, Osaka (JP); Manabu Takijiri, Osaka (JP); Yoshio Kato, Osaka (JP); Masahiro Shiraga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1052 days.

(21) Appl. No.: 17/049,412

(22) PCT Filed: Feb. 19, 2019

(86) PCT No.: PCT/JP2019/006097
§ 371 (c)(1),
(2) Date: Oct. 21, 2020

(87) PCT Pub. No.: WO2019/207924
PCT Pub. Date: Oct. 31, 2019

(65) Prior Publication Data
US 2021/0057710 A1 Feb. 25, 2021

(30) Foreign Application Priority Data
Apr. 27, 2018 (JP) ................................. 2018-086828

(51) Int. Cl.
*H01M 50/116* (2021.01)
*H01M 4/02* (2006.01)
(Continued)

(52) U.S. Cl.
CPC ......... *H01M 50/538* (2021.01); *H01M 4/133* (2013.01); *H01M 4/587* (2013.01);
(Continued)

(58) Field of Classification Search
None
See application file for complete search history.

(56) References Cited

U.S. PATENT DOCUMENTS 4,664,989 A    5/1987  Johnson
4,929,519 A *  5/1990  Catotti .................. H01M 4/622
                                               429/94

(Continued)

FOREIGN PATENT DOCUMENTS

CN      105789685 A     7/2016
JP       62-82646 A     4/1987
(Continued)

OTHER PUBLICATIONS

AZO Materials; Graphite (C)—Classifications, Properties & Applications, Sep. 10, 2002, <https://www.azom.com/article.aspx?ArticleID=1630>; (Year: 2002).*

(Continued)

*Primary Examiner* — Jessie Walls-Murray
(74) *Attorney, Agent, or Firm* — WHDA, LLP

(57) ABSTRACT

A nonaqueous electrolyte secondary battery (10) according to one embodiment of the present disclosure is provided with: an electrode body (14) which is obtained by winding a positive electrode (30) and a negative electrode (40), with a separator (50) being interposed therebetween; a nonaqueous electrolyte; and a battery case (15) which is formed of a metal and contains the electrode body (14) and the nonaqueous electrolyte. The negative electrode (40) comprises a negative electrode collector (41) and a negative electrode active material layer (42) that contains graphite particles as a negative electrode active material; the outer circumferential surface of the electrode body (14) is provided with an exposure part (43) from which the negative electrode collector (41) is exposed so as to be in contact with (Continued)

the inner circumferential surface of the battery case (15); and the graphite particles have a compressive strength of 15 MPa or more.

9 Claims, 3 Drawing Sheets

(51) Int. Cl.

| | |
|---|---|
| *H01M 4/133* | (2010.01) |
| *H01M 4/36* | (2006.01) |
| *H01M 4/587* | (2010.01) |
| *H01M 10/0525* | (2010.01) |
| *H01M 10/0567* | (2010.01) |
| *H01M 10/0587* | (2010.01) |
| *H01M 50/538* | (2021.01) |
| *H01M 10/04* | (2006.01) |

(52) U.S. Cl.
CPC ... *H01M 10/0525* (2013.01); *H01M 10/0567* (2013.01); *H01M 10/0587* (2013.01); *H01M 50/116* (2021.01); *H01M 2004/021* (2013.01); *H01M 2004/027* (2013.01); *H01M 4/366* (2013.01); *H01M 10/0431* (2013.01); *H01M 2300/0025* (2013.01)

(56) References Cited

U.S. PATENT DOCUMENTS

| | | | | |
|---|---|---|---|---|
| 5,106,707 A | * | 4/1992 | Catotti | H01M 4/623 |
| | | | | 429/223 |
| 2005/0191551 A1 | * | 9/2005 | Tsujimoto | H01M 4/505 |
| | | | | 429/223 |
| 2005/0266314 A1 | * | 12/2005 | Sheem | H01M 4/0471 |
| | | | | 252/182.1 |
| 2010/0092864 A1 | * | 4/2010 | Yokomizo | H01M 4/1393 |
| | | | | 429/212 |
| 2013/0040185 A1 | * | 2/2013 | Takase | H01M 50/457 |
| | | | | 429/144 |

| | | | | |
|---|---|---|---|---|
| 2014/0038027 A1 | * | 2/2014 | Kanemoto | H01M 50/489 |
| | | | | 429/163 |
| 2015/0207134 A1 | * | 7/2015 | Mizuno | H01M 10/052 |
| | | | | 429/61 |
| 2020/0044276 A1 | * | 2/2020 | Sakai | H01M 10/0468 |

FOREIGN PATENT DOCUMENTS

| | | | | |
|---|---|---|---|---|
| JP | H03226645 A | * | 4/1998 | G01N 3/10 |
| JP | 2008-166047 A | | 7/2008 | |
| JP | 2009-4139 A | | 1/2009 | |
| JP | 2013-26042 A | | 2/2013 | |
| WO | 2012/042830 A1 | | 4/2012 | |

OTHER PUBLICATIONS

Juner Zhu et al, "Testing and Modeling the Mechanical Properties of the Granular Materials of Graphite Anode", 2018 J. Electrochem. Soc. 165 A1160, (Year: 2018).*

Gnanaraj et al. ("The effect of pressure on the electroanalytical response of graphite anodes and LiCoO2 cathodes for Li-ion batteries", Journal of Electroanalytical Chemistry 516 (2001) 89-102, <https://www.sciencedirect.com/science/article/pii/S0022072801006635>) (Year: 2001).*

C.-W. Wang et al., "Particle Compression and Conductivity in Li-Ion Anodes with Graphite Additives", 2004 J. Electrochem. Soc. 151 A1489 (Year: 2004).*

Shimadzu, C227-E020E Brochure: "Micro Compression Testing Machine MCT Series", <https://www.shimadzu.com/an/sites/shimadzu.com.an/files/pim/pim_document_file/brochures/10345/c227-e020.pdf> (Year: 2001).*

Chika Oya, Shimazdu Application News, "Compression Tests for Anode Material for Lithium-Ion Batteries", <https://www.shimadzu.com/an/sites/shimadzu.com.an/files/pim/pim_document_file/applications/application_note/14416/an_01-00142-en.pdf> (Year: 2021).*

International Search Report dated May 7, 2019, issued in counterpart International Application No. PCT/JP2019/006097. (1 page).

English translation of Search Report dated Nov. 30, 2023, issued in counterpart CN Application No. 201980027481.6. (4 pages).

* cited by examiner

NONAQUEOUS ELECTROLYTE SECONDARY BATTERY

TECHNICAL FIELD

The present disclosure relates to a non-aqueous electrolyte secondary battery.

BACKGROUND ART

A non-aqueous electrolyte secondary battery in which charge and discharge are performed by movement of lithium ions between positive and negative electrodes has a high energy density and high capacity, and thus is widely used as a driving power source for mobile data terminals such as mobile phones, laptop computers, or smartphones, or a motive power source for power tools, electric vehicles (EV), hybrid electric vehicles (HEV, PHEV), or the like, and is expected to be expanded for further applications.

Patent Literature 1 describes a battery in which a coiled electrode assembly includes a negative electrode current collector strip, a negative electrode including a negative electrode strip, a positive electrode current collector strip, and first and second separators/strips, and is spirally wound so that the negative electrode corresponds to a member wound innermost and an extended portion of the negative electrode current collector strip forms a portion of an outer wall of the coiled electrode assembly, and the coiled electrode assembly is disposed in a container so that the container serves as a negative electrode terminal of the battery.

Patent Literature 2 describes a non-aqueous electrolyte secondary battery in which an wound-type electrode group is housed in a battery case, wherein the negative electrode includes a both-surface coating portion in which a negative electrode mixture layer is formed on both surfaces of the negative electrode current collector, and a one-surface coating portion in which the negative electrode mixture layer is formed on one surface of the negative electrode current collector, the one-surface coating portion is formed in a region positioned at the most outer circumferential portion of the electrode group, and an exposed surface of the negative electrode current collector in the one-surface coating portion is made contact with au inner surface of the battery case.

CITATION LIST

Patent Literature

PATENT LITERATURE 1: Japanese Unexamined Patent Application Publication No. Sho62-82646
PATENT LITERATURE 2: International Publication WO2012/042830

SUMMARY

A secondary battery is known which has a structure in which a surface of a negative electrode current collector is exposed on an outer peripheral surface of a wound-type electrode assembly and is in contact with an inner surface of a metal exterior body serving as a negative electrode terminal. There is a need for a secondary battery having such a structure, which is a non-aqueous electrolyte secondary battery capable of being enhanced in state of electric contact between an exposed portion of a negative electrode current collector, provided on an outer peripheral surface of au electrode assembly, and an inner peripheral surface of an exterior body, and thus suppressed in an increase in internal resistance.

A non-aqueous electrolyte secondary battery of one aspect of the present disclosure comprises an electrode assembly formed by winding a positive electrode and a negative electrode with a separator being interposed therebetween, a non-aqueous electrolyte, and a metal exterior body that houses the electrode assembly and the non-aqueous electrolyte, in which the negative electrode includes a negative electrode current collector and a negative electrode active material layer including graphite particles as a negative electrode active material, an exposed portion in which the negative electrode current collector is exposed and is in contact with an inner peripheral surface of the exterior body is provided on an outer peripheral surface of the electrode assembly, and the graphite particles have a compressive strength of 15 MPa or more.

According to a non-aqueous electrolyte secondary battery of one aspect of the present disclosure, a non-aqueous electrolyte secondary battery can be provided which is enhanced in state of electric contact between an exposed portion of a negative electrode current collector, provided on an outer peripheral surface of an electrode assembly, and an inner peripheral surface of an exterior body, and thus is suppressed in an increase in internal resistance.

DESCRIPTION OF EMBODIMENTS

Figure 1:
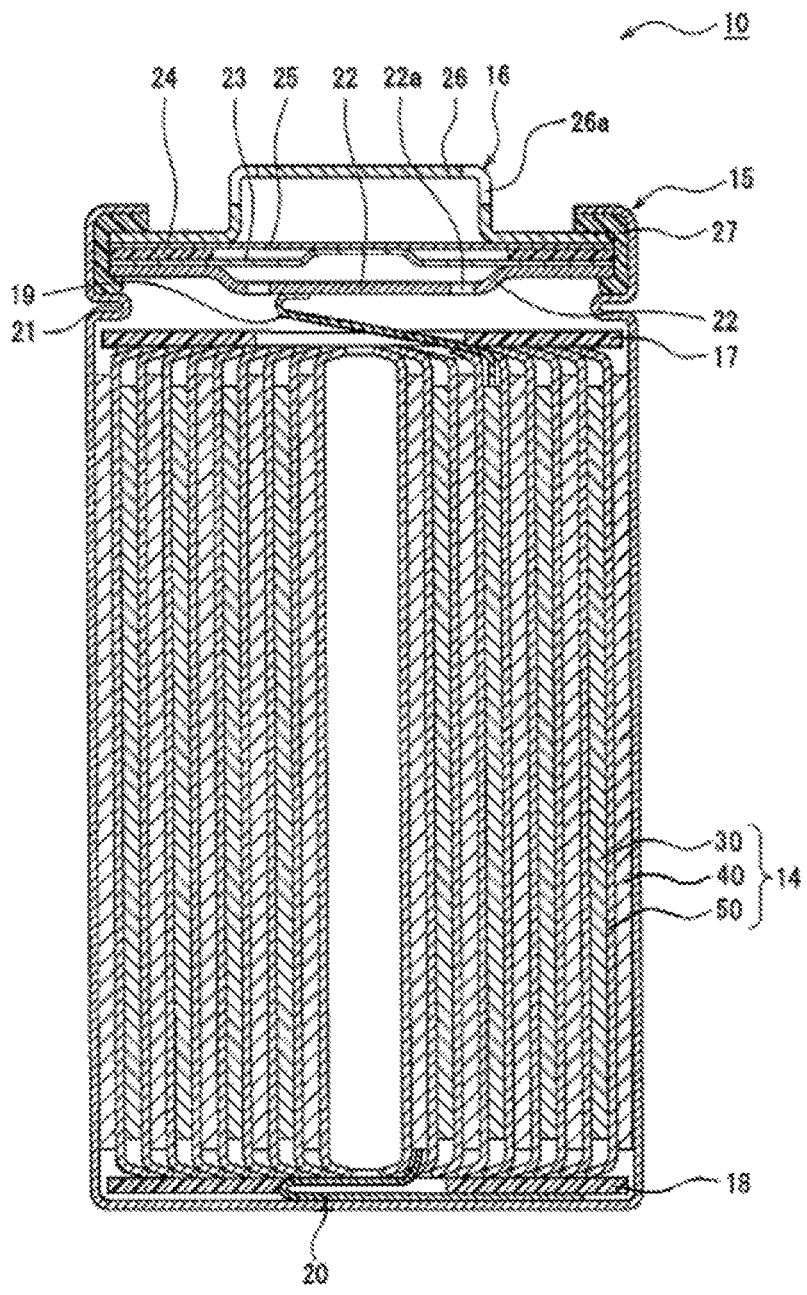
FIG. 1 is a longitudinal sectional view showing an exemplary configuration of a non-aqueous electrolyte secondary battery according to an embodiment.

Patent Literatures 1 and 2 each disclose a secondary battery having a structure in which a surface of a negative electrode current collector is exposed on an outer peripheral surface of a wound-type electrode assembly and is in contact with an inner surface of a metal exterior body serving as a negative electrode terminal. Such a secondary battery can be increased in volume of the electrode assembly and increased in capacity thereof because no negative electrode lead is required to be attached onto an outermost periphery of the electrode assembly. However, such a state of electric contact between an exposed portion of a negative electrode current collector, provided on an outer peripheral surface of an electrode assembly, and an inner peripheral surface of an exterior body is not easy to maintain, and a problem is that the negative electrode current collector is deteriorated in current collecting properties to result in an increase in internal resistance of the secondary battery.

On the contrary, the present inventors have made intensive studies, and, as a result, have found that graphite particles having a compressive strength of 15 MPa or more can be used as a negative electrode active material to thereby result in a decrease in internal resistance of a battery. A mechanism where the internal resistance is decreased due to use of the graphite particles is considered as follows. For example, stress remaining on a negative electrode due to rolling in production of the negative electrode is increased, and a force which is generated according to relaxing of stress after housing of an electrode assembly into an exterior body and which pushes the negative electrode disposed on an outermost periphery of an electrode assembly, outward in the radial direction, is increased, to thereby result in an enhancement in state of contact between an exposed portion of a negative electrode current collector, located on an outer peripheral surface of the electrode assembly, and an inner peripheral surface of the exterior body.

Hereinafter, an exemplary embodiment of the present disclosure will be described in detail with reference to the drawings. The drawings referred to in the description of embodiments are schematically illustrated, and the dimensional ratio of any constituent component depicted in the drawings may be different from that of any actual constituent component. Any specific dimensional ratio and the like are to be determined in consideration of the following description.

[Non-Aqueous Electrolyte Secondary Battery]

A configuration of a non-aqueous electrolyte secondary battery (hereinafter, also designated as "battery") 10 is described with reference to FIG. 1. FIG. 1 is a longitudinal sectional view showing a configuration of a battery 10 of an exemplary embodiment. The battery 10 includes a wound-type electrode assembly 14 formed by spirally winding a positive electrode 30 and a negative electrode 40 with a separator 50 being interposed therebetween, a non-aqueous electrolyte (not shown), and a metal battery case (exterior body) that houses the electrode assembly 14 and the non-aqueous electrolyte. A predetermined amount of the non-aqueous electrolyte is injected into the battery case, and the electrode assembly 14 is impregnated with the non-aqueous electrolyte. In FIG. 1, the battery case is shown as a cylindrical battery case including a cylindrical case body 15 having a closed-end, and a sealing assembly 16, and the battery case may be, for example, rectangular.

The case body 15 is, for example, a cylindrical metal container having a closed-end. A gasket 27 is disposed between the case body 15 and the sealing assembly 16 to ensure that the interior of the battery case is tightly sealed. The case body 15 suitably includes, for example, a projecting portion 21 which is formed by pressing a lateral surface from outside and which supports the sealing assembly 16. The projecting portion 21 is preferably formed annularly along the circumferential direction of the case body 15, and the upper surface thereof supports the sealing assembly 16.

The sealing assembly 16 includes a filter 22 in which an opening 22a of the filter is formed, and a vent member disposed on the filter 22. The vent member closes the opening 22a of the filter 22, and ruptures if the internal pressure of the battery 10 increases by heat generation due to, for example, internal short. In the present embodiment, a lower vent member 23 and an upper vent member 25 are provided as such vent members, and an insulating member 24 disposed between the lower vent member 23 and the upper vent member 25, and a cap 26 having an opening 26a are further provided. Each of the members constituting the sealing assembly 16 has, for example, a disk or ring shape, and the members other than the insulating member 24 are electrically connected to each other. Specifically, not only the filter 22 and the lower vent member 23 are connected to each other at respective circumferences, but also the upper vent member 25 and the cap 26 are connected to each other at respective circumferences. The lower vent member 23 and the upper vent member 25 are connected to each other at respective middle portions, and the insulating member 24 is interposed between respective circumferences. If the internal pressure increases by heat generation due to, for example, internal short, for example, the lower vent member 23 ruptures at a thin portion thereof, and thus the upper vent member 25 swells toward the cap 26 and leaves the lower vent member 23, thereby breaking the electrical connection between the lower and upper vent members.

The battery 10 comprises insulating plates 17 and 18 respectively disposed on and under the electrode assembly 14. In an example shown in FIG. 1, a positive electrode lead 19 attached to the positive electrode 30 passes through a through-hole in the insulating plate 17 and extends toward the sealing assembly 16. For example, the positive electrode lead 19 is connected to the lower surface of the filter 22, which is the bottom board of the sealing assembly 16, by welding or the like, and the cap 26, which is the top board of the sealing assembly 16 and electrically connected to the filter 22, serves as a positive electrode terminal. In the present embodiment, a current interrupt device (CID) and a gas-exhaust mechanism (safety valve) are provided on the sealing assembly 16. A gas-exhaust valve (not shown) is suitably provided also on the bottom of the case body 15.

Figure 2:
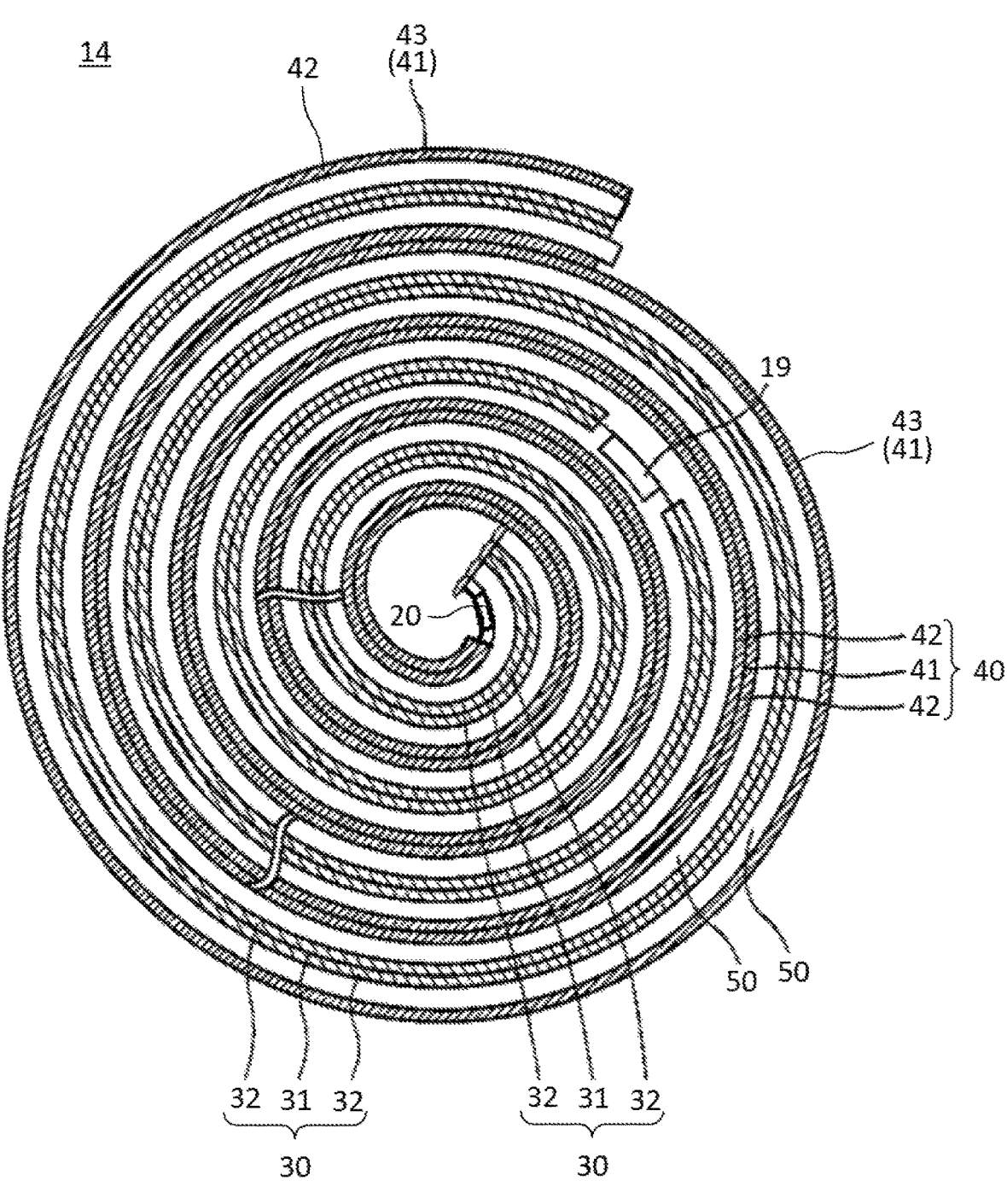
FIG. 2 is a transverse sectional view showing an exemplary configuration of an electrode assembly according to an embodiment.

FIG. 2 shows a transverse sectional view of a portion of the electrode assembly 14 housed in the battery 10. A belt-like positive electrode 30 constituting the electrode assembly 14 comprises a positive electrode current collector 31, a positive electrode active material layer 32 formed on each of both sides of the positive electrode current collector 31, and a positive electrode lead 19. One end of the positive electrode lead 19 is joined in a region in which no positive electrode active material layer 32 is formed and the positive electrode current collector 31 is exposed.

Figure 3:
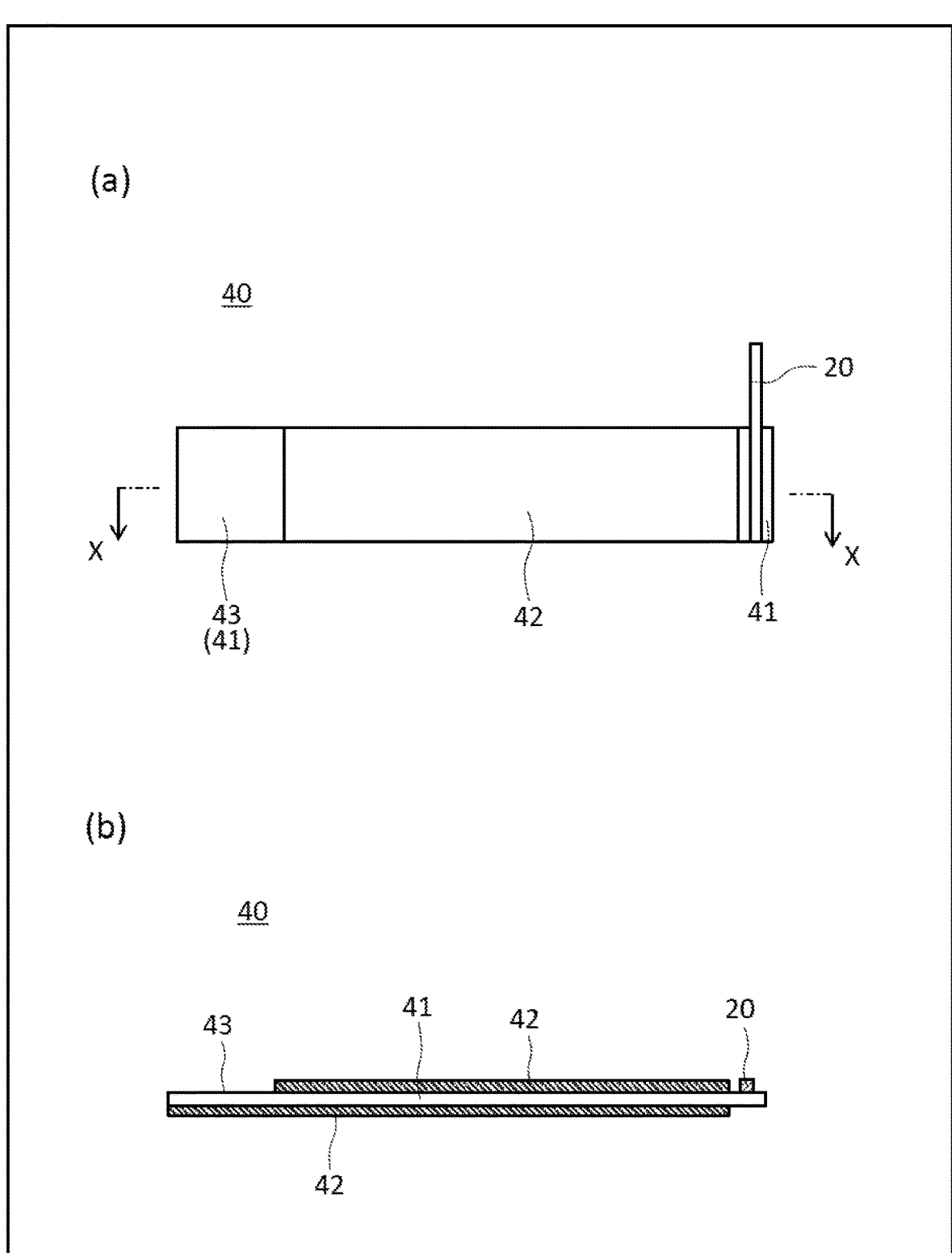
FIG. 3 is a view showing an exemplary configuration of a negative electrode according to an embodiment.

A belt-like negative electrode 40 constituting the electrode assembly 14 comprises a negative electrode current collector 41 and a negative electrode active material layer 42 formed on the negative electrode current collector 41. As shown in FIG. 1 and FIG. 2, the negative electrode 40 is disposed on an outer peripheral sur face of the electrode assembly 14 housed in the battery case, and an exposed portion 43 in which the negative electrode current collector 41 is exposed and is in contact with an inner peripheral surface of the battery case is provided on an outer peripheral surface of the negative electrode 40, disposed on the outermost periphery. FIG. 3 schematically shows an exemplary configuration of a negative electrode 40. FIG. 3(a) is a plan view observed from one main surface side of the negative electrode 40, and FIG. 3(b) is a sectional view along with the line X-X in FIG. 3(a). As shown in FIG. 3, the negative electrode 40 comprises a negative electrode current collector 41 and a negative electrode active material layer 42 formed on each of both sides of the negative electrode current collector 41. As shown in FIGS. 3(a) and (b), an exposed portion 43 provided on the negative electrode 40 is provided on one main surface of the negative electrode 40, which corresponds to one end in the longitudinal direction and which is to be located on an outermost peripheral portion of the electrode assembly 14.

The exposed portion 43 is provided on the outer peripheral surface of the electrode assembly 11 and is brought into contact with the inner peripheral surface of the battery case, also serving as a negative electrode terminal, thereby allowing electrical conduction of the negative electrode 40 and the battery case to be achieved. The exposed portion 43 of the negative electrode 40 can be in surface contact with the inner peripheral surface of the battery case over a wide range, resulting in a decrease in internal resistance of the battery 10. As a result, not only a battery excellent in large current discharge characteristics can be realized, but also a high-safety battery can be realized because current constriction upon external short can be prevented.

The negative electrode 40 in the present embodiment includes graphite particles having a compressive strength of 15 MPa or more as a negative electrode active material included in the negative electrode active material layer 42. Thus, the battery 10 according to the present embodiment can be decreased in resistance of the battery 10 due to an enhancement in state of electric contact between the exposed portion 43 of the negative electrode 40, formed on the outer peripheral surface of the electrode assembly 14, and the inner peripheral surface of the battery case (case body 15). A mechanism where the state of contact between the exposed portion 43 of the negative electrode 40 and the inner peripheral surface of the battery case can be enhanced by use of the graphite particles having a compressive strength of 15 MPa or more can be presumed as follows. The graphite particles having a compressive strength of 15 MPa or more, for use as the negative electrode active material, will be described later in detail.

The positive electrode 30 and the negative electrode 40 are each generally produced by coating a surface of the current collector with a mixture slurry including an active material, a binder, and the like, drying the resultant coating, and then rolling the current collector with both sides on which such dry coatings with the mixture slimy are formed. Any stress remains on the positive electrode 30 and the negative electrode 40 due to the pressure upon such rolling, and the stress is considered to be relaxed during production of the electrode assembly 14 and the battery 10 or during the first charge and discharge cycle of the battery 10. The graphite particles having a compressive strength of 15 MPa or more are here used as the negative electrode active material, thereby resulting in an increase in stress remaining on the negative electrode active material layer 42 by rolling, and accordingly also resulting in an increase in force generated in relaxing of the stress. Thus, when the stress is relaxed in a case where the electrode assembly 14 configured from the positive electrode 30, the negative electrode 40 and the separator 50 is housed in the battery case, a larger force is applied which tries to push the negative electrode 40 located on the outermost periphery of the electrode assembly 14, outward in the radial direction of the electrode assembly 14. As a result, the exposed portion 43 of the negative electrode 40 located on the outer peripheral surface of the electrode assembly 14 is pushed toward the inner peripheral surface of the battery case, and an excellent effect of entrancing the state of electric contact between the exposed portion and the inner peripheral surface is exerted.

Examples of the method for relaxing the stress with respect to the positive electrode 30 and the negative electrode 40 constituting the electrode assembly 14 include a method involving housing the electrode assembly 14 in a battery case body and then exposing the resultant to a high temperature, for example, about 100° C.±15° C., and a method using expansion and shrinkage of the negative electrode active material and the positive electrode active material, generated upon charge and discharge of the battery 10.

The outer size of the electrode assembly 14 in housing of the electrode assembly 14 in the battery case is preferably in the range of 95% or more and 99% or less, more preferably in the range of 98% or more and 99% or less, based on the inner size of the battery case. When the outer size of the electrode assembly 14 is in the range, the state of contact between the battery case and the electrode assembly 14 is more favorable and the internal resistance of the battery can be much more decreased. On the other hand, when the outer size of the electrode assembly 14 is too small, a uniform state of such contact is hardly obtained and the effect of decreasing the internal resistance cannot be sufficiently obtained in some cases, and when the outer size of the electrode assembly 14 is too large, the electrode assembly 14 is difficult to house in the battery case, and misalignment between the positive electrode 30 and the negative electrode 40, deformation of the electrode assembly 14, and/or the like may occur. The outer size of the electrode assembly 14 refers to a size in a cross section (substantially round surface) perpendicular to the axis direction of the electrode assembly 14, as shown in FIG. 2. The outer size of the electrode assembly 14 is, for example, the maximum value among measurement values obtained by measurement with a caliper or the like at a plurality of points.

While the battery 10 shown in FIG. 1 is exemplified in which the exposed portion 43 of the negative electrode 40 is formed throughout substantially the entire outer periphery of the electrode assembly 14, the area ratio of the exposed portion 43 to the outer peripheral surface of the electrode assembly 14 is not limited as long as a sufficient contact area with the inner peripheral surface of the battery case is ensured. For example, the area of the exposed portion 43 relative to the outer peripheral surface of the electrode assembly 14 may be 50% or more and is preferably 80% or more. The outer peripheral surface of the electrode assembly 14 means any cylindrical lateral surface except for two end surfaces of the electrode assembly 14 in the axis direction.

As shown in FIG. 1 to FIG. 3, a site in which both sides of the negative electrode current collector 41 are exposed is formed on the innermost peripheral portion of the negative electrode 40, and the negative electrode lead 20 is connected to the site. The negative electrode lead 20 is connected to the inner surface of the bottom of the case body 15 by welding or the like. A separate negative electrode lead 20, besides the exposed portion 43 connected to the inner peripheral surface of the battery case, can be provided and connected to the battery case, resulting in an increase in current collection efficiency and a further decrease in internal resistance of the battery. Furthermore, short-circuit current is dispersed even in generation of external short, thereby enabling local heat generation to be suppressed and enabling internal short due to a molten separator to be prevented. A position on the negative electrode 40, at which the negative electrode lead 20 is provided, is not limited to the innermost peripheral portion (end in the longitudinal direction, opposite to the exposed portion 43 in FIG. 3). No negative electrode lead 20 may be provided on the negative electrode 40.

As shown in FIG. 1 to FIG. 3, the negative electrode active material layer 42 is formed on a main surface of the negative electrode current collector 41, opposite to the exposed portion 43, in the negative electrode 40. Thus, the negative electrode is opposite to the positive electrode active material layer 32 of the positive electrode 30 and thus not only allows the battery capacity to be increased, but also can allow the strength of a region of the negative electrode 40, in which the exposed portion 43 is formed, to be maintained and makes it easy to facilitate housing of the electrode assembly 14 in the case body 15.

Hereinafter, the positive electrode 30, the negative electrode 40, the separator 50 and the non-aqueous electrolyte, which constitute the non-aqueous electrolyte secondary battery 10 according to the present embodiment, will be described in detail. Any symbols are omitted in the following description.

[Positive Electrode]

The positive electrode is configured from, for example, a positive electrode current collector of metal foil or the like, and a positive electrode active material layer formed on the positive electrode current collector. The positive electrode current collector here used can be, for example, foil of a metal, such as aluminum, which is stable in the electric potential range of the positive electrode, or a film in which such a metal is disposed on an outer layer. The positive electrode active material layer includes, for example, a positive electrode active material, a binder, and a conductive agent.

The positive electrode is obtained by for example, coating the positive electrode current collector with a positive electrode mixture slurry including, for example, a positive electrode active material, a conductive agent, and a binder, and drying the resultant to thereby form the positive electrode active material layer on the positive electrode current collector, and then rolling the positive electrode active material layer. The thickness of the positive electrode current collector is not particularly limited, and is, for example, about 10 μm or more and 100 μm or less.

The positive electrode active material layer includes a positive electrode active material including a lithium/transition metal oxide. The lithium/transition metal oxide can be, for example, a lithium/transition metal oxide containing lithium (Li) and any transition metal element(s) such as cobalt (Co), manganese (Mn), and/or nickel (Ni). The lithium/transition metal oxide may include any additive element(s) other than Co, Mn, and Ni, and examples include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_2$, $Li_xMn_2O_4$, $Li_xMn_{2-y}M_yO_2$, $LiMPO_4$, $Li_2MPO_4F$ (in each chemical formula, M is at least one of Na, Mg, Sc, Y, Mn, Fe, Co, Ni, Cu, Zn, Al, Cr, Pb, Sb, and B, $0<x\le1.2$, $0<y\le0.9$, $2.0\le z\le2.3$). Such lithium/transition metal oxides may be used singly or a plurality thereof may be mixed and used.

The conductive agent here used can be a known conductive agent that enhances electric conductivity of the positive electrode mixture layer, and examples include carbon powders such as carbon black, acetylene black, Ketjenblack, and graphite. These may be used singly or in combinations of two or more thereof.

The binder here used can be any known binder which maintains a favorable state of contact with the positive electrode active material and/or the conductive agent and which enhances bindability of the positive electrode active material to a surface of the positive electrode current collector, and examples thereof include a fluoropolymer and a rubber polymer. Examples of the fluoropolymer include polytetrafluoroethylene (PTFE), poly(vinylidene fluoride) (PVdF), and any modified product thereof, and examples of the rubber polymer include an ethylene-propylene-isoprene copolymer and an ethylene-propylene-butadiene copolymer. These may be used singly or in combinations of two or more thereof. The binder may be used in combination with a thickener such as carboxymethyl cellulose (CMC) or polyethylene oxide (PEO).

[Negative Electrode]

The negative electrode is configured from, for example, a negative electrode current collector of metal foil or the like, and a negative electrode active material layer formed on the negative electrode current collector. The negative electrode current collector here used can be, for example, foil of a metal, such as copper, which is stable in the electric potential range of the negative electrode, or a film in which such a metal is disposed on an outer layer. The negative electrode active material layer includes, for example, a negative electrode active material, a binder, and a thickener, and includes the above graphite particles as the negative electrode active material.

The negative electrode can be produced by, for example, coating the negative electrode current collector with a negative electrode mixture slurry including, for example, a negative electrode active material, a binder, and a thickener, drying the resultant coating, and then rolling the coating to thereby form the negative electrode active material layer on each of both sides of the current collector. The thickness of the negative electrode current collector is preferably 5 μm or more and 40 μm or less, more preferably 10 μm or more and 20 μm or less from the viewpoint of, for example, current collecting properties and mechanical strength.

The negative electrode in the present embodiment contains graphite particles having a compressive strength of 15 MPa or more as a negative electrode active material that intercalate and deintercalate lithium ions. The graphite particles basing a compressive strength of 15 MPa or more are thus used as the negative electrode active material, thereby relaxing the stress remaining due to rolling of such a dry coating with the negative electrode mixture slurry and applying a force that pushes an exposed portion of the negative electrode, provided on an outer peripheral surface of the electrode assembly, outward in the radial direction of the electrode assembly. It is consequently considered that the state of contact between the exposed portion and the inner peripheral surface of the battery case body serving as a negative electrode terminal is favorably maintained and the internal resistance of the battery is decreased. The upper limit of the compressive strength of the graphite particles is not particularly limited, and is, for example, preferably 30 MPa or less from the viewpoint of the pressing pressure necessary for rolling of an electrode plate.

In the present disclosure, the compressive strength of the graphite particles means the compressive force (MPa) in deformation until the particle size (volume average particle size) of graphite particles a1 varies by 10% due to load application at a predetermined rate of load application in the center direction of the graphite particles at room temperature. The compressive strength of the graphite particles may be measured with, for example, a known compression testing apparatus such as a micro compression testing machine (MCT-211 manufactured by Shimadzu Corporation).

The graphite particles in the present embodiment may be any graphite material conventionally used as any negative electrode active material for non-aqueous electrolyte secondary batteries, and, for example, natural graphite such as massive graphite and earthy graphite, and artificial graphite such as massive artificial graphite and graphitized mesophase carbon microbeads can be used.

The graphite particles having a compressive strength of 15 MPa or more in the present embodiment are obtained as graphite particles having objective compressive strength by, for example, immersing a carbon material serving as an electrode current collector material such as coke or natural graphite in tar or pitch, and appropriately controlling the volatile content at 1800° C. to 3000° C. in a heat treatment at 900 to 1300° C. and then a graphitization treatment of the carbon material immersed, in an inert atmosphere. There can be adjusted by applying impact or a shear force to a graphitized product obtained by the graphitization treatment, and examples of a specific method include a method involving pulverizing the graphitized product in an inert atmosphere. For example, a hammer mill, a pin mill, or a jet mill can be used in the pulverizing method. The strength of the graphite particles is enhanced also by coating surfaces of the particles with coal or petroleum pitch. Not only such artificial graphite, but also natural graphite having a compressive strength of 15 MPa or more may be used.

The ratio S2/S1 of the measured surface area S2 to the apparent surface area S1 of the graphite particles in the present embodiment is preferably 10 or less, more preferably 5 or less. The "apparent surface area S1" here corresponds to the surface area of a sphere, determined from the volume average particle size $D_{50v}$ of the graphite particles under the assumption that the graphite particles are spheres, and is calculated according to expression $S1=\pi\times(D_{50v})^2$. The "measured surface area S2" corresponds to the surface area of the graphite particles, obtained by actual measurement, and can be determined from, for example, the BET specific surface area measured based on the BET method.

Such graphite particles where the ratio S2/S1 of the measured surface area S2 to the apparent surface area S1 is in the range can be used as the negative electrode active material, thereby reducing the proportion of stress applied in rolling of the dry coating with the negative electrode mixture slurry, which is absorbed into pores in the graphite particles, and increasing stress remaining on the negative electrode active material layer. As a result, the state of contact between the exposed portion of the negative electrode, provided on the outer peripheral surface of the electrode assembly, and the inner peripheral surface of the battery case body can be much more improved, and the internal resistance of the battery can be decreased, as described above.

The ratio S2/S1 of the measured surface area S2 to the apparent surface area S1 of the graphite particles can be determined according to, for example, the following expression.

$$S2/S1-\eta\times\rho\times D_{50v}/6$$

In the expression, $\eta$ represents the BET specific surface area of the graphite particles, $\rho$ represents the real density of graphite, and $D_{50v}$ represents the volume average particle size of the graphite particles. The BET specific surface area ($\eta$) of the graphite particles may be measured by a known method and may be measured with, for example, a specific surface area measuring apparatus (Macsorb (registered trademark) HM model-1201 manufactured by MOUNTECH Co., Ltd.). In the present embodiment, the real density ($\rho$) of graphite is 2.26 g/cm³ in calculation of the ratio S2/S1. The volume average particle size ($D_{50v}$) of the graphite particles corresponds to, for example, the particle size at a volume cumulative value of 50% in a particle size distribution of the graphite particles, measured according to a laser diffraction scattering method, and may be measured with, for example, a laser diffraction scattering particle size distribution measuring apparatus (manufactured by MicrotracBEL Corp.).

The ratio S2/S1 of the measured surface area S2 to the apparent surface area S1 of the graphite particles for use as the negative electrode active material can be adjusted by, for example, appropriately changing the ratio between an electrode current collector material and tar or pitch in immersion of a carbon material serving as the electrode current collector material, such as coke or natural graphite, in the tar or pitch in the course of production of graphite.

The volume average particle size ($D_{50v}$) of the graphite particles in the present embodiment is, for example, 5 μm or more and 30 μm or less, preferably 10 μm or more and 25 μm or less.

The negative electrode mixture layer may contain, for example, lithium metal, a lithium alloy such as a lithium-aluminum alloy, a lithium-lead alloy, a lithium-silicon alloy, or a lithium-tin alloy, a carbon material having a compressive strength of less than 15 MPa, such as graphite, coke, or an organic fired material, and/or a metal oxide such as $SnO_2$, SnO, or $TiO_2$, in addition to the graphite particles in the present embodiment, as the negative electrode active material. The graphite particles having a compressive strength of 15 MPa or more in the present embodiment is preferably at a rate of 50 mass % or more, more preferably 75 mass % or more based on the total amount of the negative electrode active material from the viewpoint of relaxing stress of the negative electrode active material at the first charge and discharge cycle.

The binder here used may be, for example, a fluoropolymer or a rubber polymer as in the case of the positive electrode, or may be, for example, a styrene-butadiene copolymer (SBR) or a modified product thereof.

Examples of the thickener include carboxymethyl cellulose (CMC) or polyethylene oxide (PEO). These may be used singly or in combinations of two or more thereof.

[Non-Aqueous Electrolyte]

The non-aqueous electrolyte includes a non-aqueous solvent and an electrolyte salt dissolved in the non-aqueous solvent. The non-aqueous solvent for use in the non-aqueous electrolyte can be, for example, esters, ethers, nitriles, amides such as dimethylformamide, and a mixed solvent of two or more thereof, and a halogen-substituted product can also be used which is formed by replacing at least one hydrogen atom of any of the above solvents with a halogen atom such as fluorine. These may be used singly or in combinations of two or more thereof. The non-aqueous electrolyte is not limited to a liquid electrolyte (non-aqueous electrolyte solution), and may be a solid electrolyte using a gel polymer or the like.

In the present embodiment, the non-aqueous electrolyte preferably contains a fluorinated cyclic carbonate. A fluorinated cyclic carbonate is used as the non-aqueous electrolyte, thereby allowing a covering (SEI covering) derived from the fluorinated cyclic carbonate to be formed on the negative electrode in the first charge and discharge. Thus, formation of the covering on the negative electrode in the first charge and discharge of the battery and the effect of relaxing of stress due to expansion/shrinkage of the negative electrode active material can be synergistically affected to thereby allow the variation in effect of a decrease in internal resistance with respect to each individual product to be suppressed and allow a low-resistance battery to be produced at a more uniform quality.

The fluorinated cyclic carbonate is not particularly limited as long as it is a cyclic carbonate containing at least one fluorine atom, and examples thereof include monofluoroethylene carbonate (FEC), 1,2-difluoroethylene carbonate, 1,2,3-trifluoropropylene carbonate, 2,3-difluoro-2,3-butylene carbonate, and 1,1,1,4,4,4-hexafluoro-2,3-butylene carbonate. These may be used singly or in combinations of two or more thereof. Among these, monofluoroethylene carbonate (FEC) is particularly preferable from the viewpoint of, for example, stability of resistance in the constitution of the present invention. The reason for this is not clear, but is considered because the hardness of a covering produced on a graphite surface by monofluoroethylene carbonate is particularly high.

The content of the fluorinated cyclic carbonate is, for example, preferably 1 volume % or more and 30 volume % or less, more preferably 2 volume % or more and 20 volume % or less based on the total amount of the non-aqueous electrolyte. A too low content of the fluorinated cyclic carbonate may cause the amount of production of the covering derived from the fluorinated cyclic carbonate formed in the first charge and discharge to be decreased, resulting in deterioration in effect of an improvement in electric contact between the exposed portion of the negative electrode and a metal case body. A too high content of the fluorinated cyclic carbonate may deteriorate thermal stability of the covering formed on the negative electrode.

Examples of the esters included in the non-aqueous electrolyte can include cyclic carbonates, chain carbonates, and carboxylate esters. Examples of the cyclic carbonates include ethylene carbonate (EC), propylene carbonate (PC), and butylene carbonate. Examples of the chain carbonates include dimethyl carbonate (DMC), ethyl methyl carbonate (EMC), diethyl carbonate (DEC), methyl propyl carbonate, ethyl propyl carbonate, and methyl isopropyl carbonate. Examples of the carboxylate esters include methyl acetate, ethyl acetate, propyl acetate, methyl propionate (MP), ethyl propionate, γ-butyrolactone (GBL), and γ-valerolactone (GVL).

Examples of the cyclic ethers included in the non-aqueous electrolyte include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers.

Examples of the chain ethers included in the non-aqueous electrolyte include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles included in the non-aqueous electrolyte include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

The electrolyte salt included in the non-aqueous electrolyte is preferably a lithium salt. The lithium salt may be any salt commonly used as a support salt in a conventional non-aqueous electrolyte secondary battery. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiC(C_2F_5SO_2)$, $LiCF_3CO_2$, $Li(P(C_2O_4)F_4)$, $Li(P(C_2O_4)F_2)$, $LiPF_{6-x}(C_nF_{2n+1})_x$ ($1 \leq x \leq 6$, n is 1 or 2), $LiB_{10}Cl_{10}$, LiCl, LiBr, LiI, chloroborane lithium, lithium lower aliphatic carboxylate, borate salts such as $Li_2B_4O_7$, $Li[B(C_2O_4)_2]$ [lithium-bis(oxalato)borate (LiBOB)], and $Li[B(C_2O_4)F_2]$, and imide salts such as $Li[P(C_2O_4)F_4]$, $Li[P(C_2O_4)_2F_2]$, $LiN(FSO_2)_2$, and $LiN(C_lF_{2l+1}SO_2)(C_mF_{2m+1}SO_2)$ {where l and m are integers of 0 or more}. These lithium salts may be used singly or two or more thereof may be mixed and used.

[Separator]

For example, an ion-permeable and insulating porous sheet is used as the separator. Specific examples of the porous sheet include a microporous thin film, woven fabric, and nonwoven fabric. The material for the separator is, for example, suitably an olefin resin such as polyethylene or polypropylene, or cellulose. The separator may be a laminate including a cellulose fiber layer and a layer of fillers of a thermoplastic resin such as an olefin resin. The separator may be a multi-layered separator including a polyethylene layer and a polypropylene layer, and a surface of a separator to be used may be coated with a material such as an aramid resin or ceramic.

EXAMPLES

Hereinafter, the present disclosure will be further described with reference to Examples, but the present disclosure is not intended to be limited to the following Examples.

Example 1

[Production of Positive Electrode]

A lithium complex oxide represented by general formula $LiNi_{0.8}Co_{0.15}Al_{0.05}O_2$ was used as a positive electrode active material. Mixed were 100 mass % of the positive electrode active material, 1 mass % of acetylene black as a conductive agent, and 0.9 mass % of poly(vinylidene fluoride) as a binder, and N-methyl-2-pyrrolidone (NMP) was added thereto to thereby prepare a positive electrode mixture slurry. Then, both sides of a positive electrode current collector made of aluminum, having a thickness of 15 μm, were coated with the positive electrode mixture slurry by a doctor blade method. The resultant coatings with the positive electrode mixture slurry were dried, and then cut out so as to have a predetermined electrode size, and the resultant dry coatings were then rolled by a roller. Thus, a positive electrode was produced which included a positive electrode active material layer having a thickness of 70 μm on each of both sides of the positive electrode current collector.

[Production of Negative Electrode]

Coke and a pitch binder were pulverized and mixed, and then fired at 1000° C. and then subjected to a graphitization treatment at 3000° C. The resultant was pulverized by a ball mill in an $N_2$ atmosphere and the resultant powder was classified, to thereby obtain graphite particles a1.

The compressive strength of graphite particles a1 was measured with a micro compression testing machine (MCT-211 manufactured by Shimadzu Corporation). The compressive force (MPa) in deformation until the volume average particle size of graphite particles a1 varied by 10% due to load application at a rate of load application of 4.46 mN/sec in the center direction of graphite particles a1 at room temperature in measurement of the compressive strength was defined as the compressive strength of graphite particles a1. In the measurement, particles having a volume average particle size of 40 μm or more and 60 μm or less were selected, and the average value obtained by performing the measurement ten times was defined as the compressive strength. As a result, graphite particles a1 had a compressive strength of 17.8 MPa.

As a result of measurement with a specific surface area measuring apparatus (Macsorb (registered trademark) HM model-1201 manufactured by MOUNTECH Co., Ltd.) and a laser diffraction scattering particle size distribution measuring apparatus (manufactured by MicrotracBEL Corp., MT3000), graphite particles a1 had a BET specific surface area of 0.6 m²/g and graphite particles a1 had a volume average particle size of 15 μm. The ratio S2/S1 of the measured surface area S2 to the apparent surface area S1 of graphite particles a1 was calculated from the BET specific surface area and volume average particle size of graphite particles a1, and was 3.4.

Mixed were 100 parts by mass of graphite particles a1. 1 part by mass of carboxymethyl cellulose (CMC) as a thickener, and 1 part by mass of a styrene-butadiene copolymer (SBR) as a binder, and water was added thereto to thereby prepare a negative electrode mixture slurry. Then, both sides of a negative electrode current collector made of copper, having a thickness of 10 μm, were coated with the negative electrode mixture slurry by a doctor blade method. Here, one end of one side of the negative electrode current collector in the longitudinal direction was not coated with the negative electrode mixture slurry, and thus an exposed portion was formed in which the negative electrode current collector was exposed. The resultant coatings with the negative electrode mixture slurry were dried, and then cut out so as to have a predetermined electrode size, and the resultant dry coatings were then rolled by a roller. Thus, a negative electrode was produced which not only included a negative electrode active material layer having a thickness of 80 μm on each of both sides of the negative electrode current collector, but also included an exposed portion having a width of 80 mm from an edge in the longitudinal direction, formed on one side of the negative electrode current collector.

[Preparation of Non-Aqueous Electrolyte]

Ethylene carbonate (EC), ethyl methyl carbonate (EMC), and dimethyl carbonate (DMC) were mixed at a volume ratio of 30:30:40 (room temperature). $LiPF_6$ was dissolved in such a mixed solvent, in an amount so as to be at a concentration of 1.3 mol/L in a non-aqueous electrolyte after preparation, to thereby prepare non-aqueous electrolyte e1.

[Production of Non-Aqueous Electrolyte Secondary Battery]

An aluminum lead and a nickel lead were attached to the positive electrode and the negative electrode, respectively, and the positive electrode and the negative electrode were wound with a polyethylene separator being interposed therebetween, thereby producing a wound-type electrode assembly. The positive electrode, the negative electrode, and the separator were here wound so that an exposed portion of the negative electrode was disposed on an outer peripheral surface of the electrode assembly and the negative electrode current collector was exposed. The electrode assembly was housed in a cylindrical battery case body having a closed-end and having an outer size of 18 mm and a height of 65 mm. The ratio of the outer size of the electrode assembly to the inner size of the battery case body was here 98%. Then, non-aqueous electrolyte e1 was injected into an iron battery case body, and then the opening of the battery case body was sealed by a gasket and a sealing assembly, to thereby produce 18650-type cylindrical non-aqueous electrolyte secondary battery A1.

Example 2

Graphite particles a2 were produced in the same manner as in Example 1 except that the time taken for pulverizing and mixing coke and the pitch binder was adjusted in the step of producing the graphite particles so that graphite particles a2 had a compressive strength of 17.0 MPa in the same measurement of the compressive strength as in graphite particles a1. Graphite particles a2 had a BET specific surface area of 1.5 $m^2/g$ and a volume average particle size of 15 μm, and the ratio S2/S1 of the measured surface area S2 to the apparent surface area S1 of the particles was calculated to be 8.8. Cylindrical non-aqueous electrolyte secondary battery A2 was produced in the same manner as in Example 1 except that graphite particles a2 were used instead of graphite particles a1.

Comparative Example 1

Graphite particles b1 were obtained in the same manner as in Example 1 except that the mixing ratio of coke and the pitch binder and the time taken for pulverizing and mixing them were adjusted in the step of producing the graphite particles so that graphite particles b1 had a compressive strength of 11.8 MPa in the same measurement of the compressive strength as in graphite particles a1. Graphite particles b1 had a BET specific surface area of 1.8 $m^2/g$ and a volume average particle size of 22 μm, and the ratio S2/S1 of the measured surface area S2 to the apparent surface area S1 of the particles was calculated to be 14.4. Cylindrical non-aqueous electronic secondary battery B1 was produced in the same manner as in Example 1 except that graphite particles b1 were used instead of graphite particles a1.

Comparative Example 2

Graphite particles b2 were obtained in the same manner as in Example 1 except that the mixing ratio of coke and the pitch binder and the time taken for pulverizing and mixing them were adjusted in the step of producing the graphite particles so that graphite particles b2 had a compressive strength of 2.5 MPa in the same measurement of the compressive strength as in graphite particles a1. Graphite particles b2 had a BET specific surface area of 3.8 $m^2/g$ and a volume average particle size of 23.5 μm, and the ratio S2/S1 of the measured surface area S2 to the apparent surface area S1 of the particles was calculated to be 32.5. Cylindrical non-aqueous electrolyte secondary battery B2 was produced in the same manner as in Example 1 except that graphite particles b2 were used instead of graphite particles a1.

[Resistance Measurement Test]

Each of the batteries produced in Examples and Comparative Examples was used and was subjected to charge and discharge once at a charge and discharge current 1 It (1 It corresponded to a current value for discharging the battery capacity in 1 hour, and 1 It was here 3000 mA), a charge cutoff voltage of 42 V, and a discharge cutoff voltage of 3 V in a temperature condition of 25° C. Then, such each battery was charged in conditions of a charge and discharge current of 1 It and a charge cutoff voltage of 4.2 V in a temperature condition of 25° C. and the AC resistance of the battery at 1 kHz upon termination of the second charge was measured. The results are shown in Table 1.

TABLE 1

|  | Compressive strength [MPa] | Ratio S2/S1 | Internal resistance [mΩ] |
|---|---|---|---|
| Example 1 | 17.8 | 3.4 | 18.0 |
| Example 2 | 17.0 | 8.8 | 18.8 |
| Comparative Example 1 | 11.8 | 14.4 | 19.7 |
| Comparative Example 2 | 2.5 | 32.5 | 19.7 |

Example 3

Ethylene carbonate (EC), monofluoroethylene carbonate (FEC), ethyl methyl carbonate (EMC), and dimethyl car-

2

US 12,695,162 B2

15 bonate (DMC) were mixed at a volume ratio of 20:10:30:40 (room temperature). $LiPF_6$ was dissolved in such a mixed solvent, in an amount so as to be at a concentration of 1.3 mol/L in a non-aqueous electrolyte after preparation, to thereby prepare non-aqueous electrolyte e2. Cylindrical non-aqueous electrolyte secondary battery A3 was produced in the same manner as in Example 1 except that non-aqueous electrolyte e2 was used instead of non-aqueous electrolyte e1.

[Measurement of Variation]

Five cylindrical non-aqueous electrolyte secondary batteries A1 produced according to the method described in Example 1 and five cylindrical iron-aqueous electrolyte secondary batteries A3 produced according to the method described in Example 3 were each subjected to the resistance measurement test. The standard deviation σ was determined based on internal resistance values measured, and the variation in internal resistance of each of the batteries with respect to each production was evaluated. As a result, while both the batteries had an average AC resistance value of 18.0 mΩ, measured at 1 kHz, the standard deviation σ with respect to battery A1 of Example 1 was $8.0 \times 10^{-3}$ mΩ, and on the contrary, that with respect to battery A3 of Example 3 using non-aqueous electrolyte e2 including FEC was $5.0 \times 10^{-5}$ mΩ.

TABLE 2

| | FEC | Internal resistance [mΩ] | standard deviation σ [mΩ] |
| --- | --- | --- | --- |
| Example 1 | Not contained | 18.0 | $8.0 \times 10^{-3}$ |
| Example 3 | Contained | 18.0 | $5.0 \times 10^{-5}$ |

As shown in Table 1, batteries A1 and A2 of Examples 1 and 2, using graphite particles a1 and a2 each having a compressive strength of 15 MPa or more, each exhibited an extremely reduced AC resistance value as compared with batteries B1 and B2 of Comparative Examples 1 and 2, using graphite particles b1 and b2 each having a compressive strength of less than 15 MPa. This means a more improvement in state of electric contact between the exposed portion of the negative electrode current collector, provided on the outer peripheral portion of the wound-type electrode assembly, and the inner peripheral surface of the battery case body also serving as a negative electrode terminal.

As shown in Table 2, battery A3 of Example 3, using graphite particles aa having a compressive strength of 15 MPa or more and also using non-aqueous electrolyte e2 containing monofluoroethylene carbonate (FEC), was extremely reduced in standard deviation σ of the AC resistance value and could be suppressed in variation in AC resistance value with respect to each individual product, as compared with battery A1 of Example 1, using graphite particles a1 and using non-aqueous electrolyte e1 not containing FEC.

REFERENCE SIGNS LIST 10 non-aqueous electrolyte secondary battery (battery)
14 electrode assembly
15 case body
16 sealing assembly
17, 18 insulating plate
19 positive electrode lead
20 negative electrode lead
21 projecting portion

16

22 filter
22a opening of filler
23 lower vent member
24 insulating member
25 upper vent member
26 cap
26a opening of cap
27 gasket
30 positive electrode
31 positive electrode current collector
32 positive electrode active material layer
40 negative electrode
41 negative electrode current collector
42 negative electrode active material layer
43 exposed portion
50 separator

The invention claimed is:

1. A non-aqueous electrolyte secondary battery, comprising:

an electrode assembly formed by winding a positive electrode and a negative electrode with a separator being interposed between the positive electrode and the negative electrode;

a non-aqueous electrolyte; and a metal exterior body that houses the electrode assembly and the non-aqueous electrolyte; wherein the negative electrode includes a negative electrode current collector being a metal foil, and a negative electrode active material layer including graphite particles as a negative electrode active material, the negative electrode comprises a peripheral part thereof located at an outer peripheral surface of the electrode assembly, one surface of the peripheral part of the negative electrode forms an exposed portion in which the negative electrode current collector is exposed and is in direct physical contact with an inner peripheral surface of the exterior body, another surface opposite the one surface of the peripheral part of the negative electrode forms a non-exposed portion that has the negative electrode active material layer disposed on the negative electrode current collector, wherein the non-exposed portion is directly opposite the exposed portion in a thickness direction of the negative electrode, and the graphite particles have a compressive strength of 15 MPa or more and 30 MPa or less, wherein the compressive strength of the graphite particles is measured as a compressive force in deformation testing at which a variation of a particle size of a specimen of the graphite particles having an original volume average particle size of 40 μm or more and 60 μm or less, due to load application at a rate of 4.46 mN/sec in a center direction of the graphite particles at room temperature, reaches 10% from the original volume average particle size.

2. The non-aqueous electrolyte secondary battery according to claim 1, wherein a ratio S2/S1 of a measured surface area S2 to an apparent surface area S1 of the graphite particles is 10 or less.

3. The non-aqueous electrolyte secondary battery according to claim 1, wherein the non-aqueous electrolyte includes a fluorinated cyclic carbonate.

4. The non-aqueous electrolyte secondary battery according to claim 3, wherein the fluorinated cyclic carbonate is monofluoroethylene carbonate.

5. The non-aqueous electrolyte secondary battery according to claim 3, wherein a content of the fluorinated cyclic carbonate is 1 volume % or more and 30 volume % or less based on a total amount of the non-aqueous electrolyte.

6. The non-aqueous electrolyte secondary battery according to claim 1, wherein the compressive strength of the graphite particles is 15 MPa or more and 18 MPa or less.

7. The non-aqueous electrolyte secondary battery according to claim 1, wherein a thickness of the negative electrode current collector is 5 μm or more and 40 μm or less.

8. The non-aqueous electrolyte secondary battery according to claim 1, wherein a thickness of the negative electrode current collector is 10 μm or more and 20 μm or less.

9. The non-aqueous electrolyte secondary battery according to claim 1, wherein the negative electrode current collector is formed of a copper foil.

* * * * *